Oct. 21, 1952
S. MOSZELT
2,614,630
WINDSHIELD COVER
Filed Feb. 2, 1951
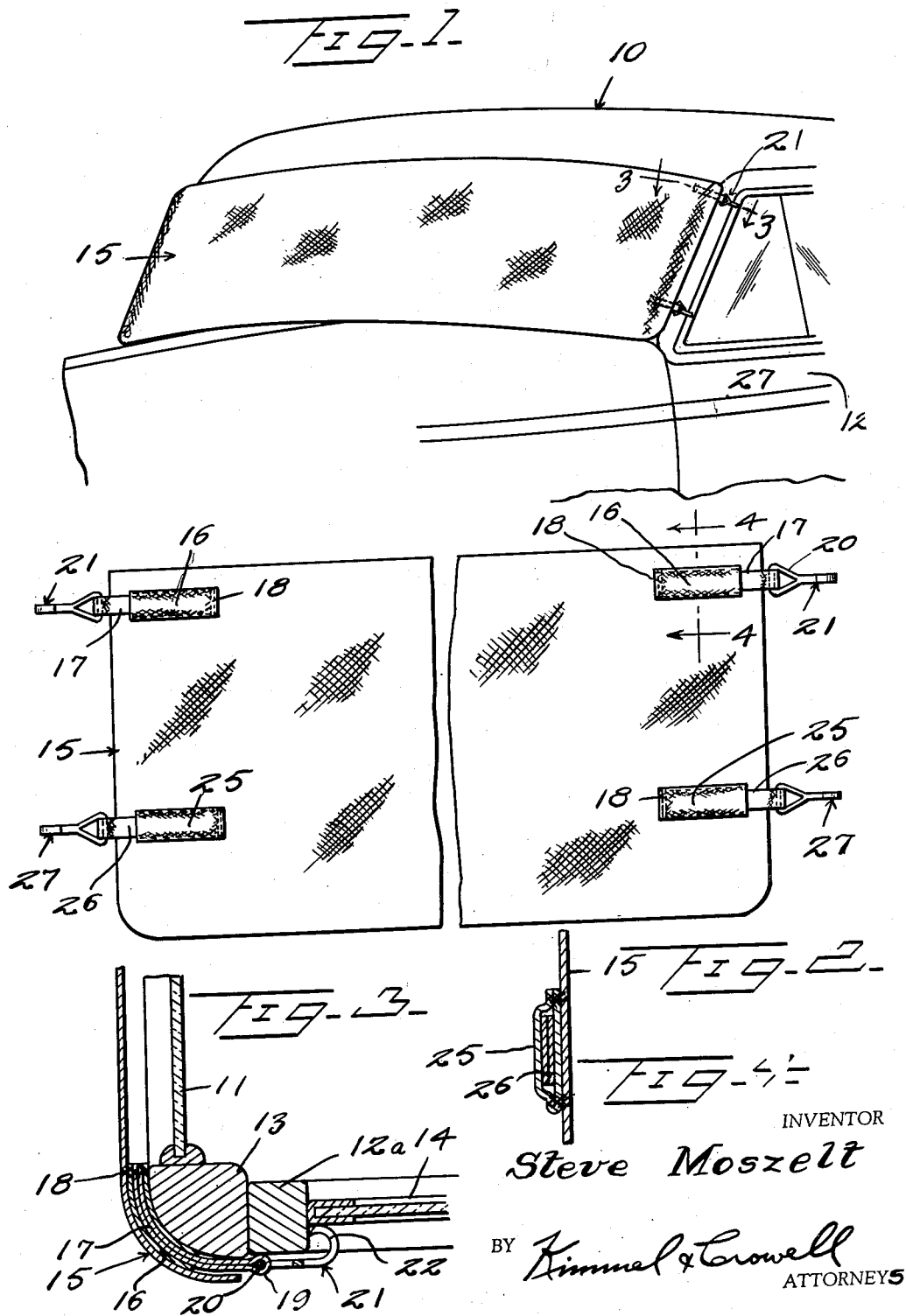
INVENTOR
*Steve Moszelt*
BY *Kimmel & Crowell*
ATTORNEYS Patented Oct. 21, 1952

2,614,630

UNITED STATES PATENT OFFICE 2,614,630

WINDSHIELD COVER

Steve Moszelt, Akron, Ohio

Application February 2, 1951, Serial No. 209,051

1 Claim. (Cl. 160—368)

This invention relates to a windshield cover and more particularly to such a cover adapted to protect the windshield of an idle vehicle from snow, sleet, hail, rain, dust, and the like.

A primary object of the invention is the provision of an improved cover of this character provided with means for facilitating the application and removal thereof with a minimum of effort and difficulty.

A further object of the invention is the provision of such a device which may be readily applied to any and all makes of motor vehicle.

Other objects reside in the combination of the elements, arrangements of parts and features of construction, all as will be more fully pointed out hereinafter and shown in the accompanying drawing, wherein there is disclosed a preferred embodiment of this inventive concept.

In the drawings:

Figure 1 is a perspective view of a portion of a motor vehicle showing a cover applied to the windshield thereof.

Figure 2 is a rear elevational view of the screen shown in Figure 1.

Figure 3 is an enlarged sectional view taken substantially along the line 3—3 of Figure 1 as viewed in the direction indicated by the arrows.

Figure 4 is an enlarged sectional view taken substantially along line 4—4 of Figure 2.

Similar reference characters refer to similar parts throughout the several views of the drawings.

Referring to the drawings now in detail, there is shown in Figure 1 a motor vehicle generally indicated at 10 which includes a windshield 11, a door 12, and a vertical door post 13. The door includes the customary window posts 12a and glass windowpane 14 as best shown in Figure 3.

Referring now to the cover in detail the latter is indicated generally at 15 and comprises a sheet of water resistant material of a size completely to cover the windshield of the vehicle.

Adjacent each of the upper corners of the device are positioned pockets or slots 16, within which are secured elastic strips 17 as by stitches 18. At the outer end of each strip there is provided a looped elastic portion 19 within which is positioned the end portion 20 of a hook generally indicated at 21 provided with a bight 22, the hook being adapted to be positioned about the window post 12a in abutting relation with a glass 13.

Similar pockets 25 are positioned adjacent the lower edge of sheet 15 and contain corresponding elastic strips to which are secured hooks generally indicated at 27 and identical in design to hooks 21.

It will thus be seen that by means of the four hook members previously described the sheet 15 may be firmly affixed to the sides of the vehicle thus completely covering the windshield and protecting the same in all types of weather.

Obviously the device may be utilized with a door post construction as shown in Figure 3 or may alternatively be utilized in such manner that the hook portions 21 and 27 engage in the rain gutters of those types of vehicles provided with such gutters.

As many embodiments may be made of this inventive concept and as many modifications may be made in the embodiment hereinbefore shown and described, it is to be understood that all matter herein is to be interpreted merely as illustrative, and not in a limiting sense.

I claim:

In a windshield cover the combination of a water repellant rectangular cover of an extent completely to cover said windshield, pockets open at their outer ends and closed at their inner ends, stitched to said cover respectively adjacent the four corners thereof, elastic strips having their inner ends secured in said pockets, and hook members secured to the outer ends of said elastic strips, certain of said pockets being spaced closely adjacent the top of said rectangular cover and other of said pockets being spaced at a distance from the opposite edge thereof, whereby the portion of said cover below said other pocket may overlie the hood of a vehicle.

STEVE MOSZELT.

REFERENCES CITED

The following references are of record in the file of this patent:

UNITED STATES PATENTS

| Number | Name | Date |
|---|---|---|
| 1,470,606 | George | Oct. 16, 1923 |
| 1,732,447 | Crane | Oct. 22, 1929 |
| 2,489,901 | Kocinski | Nov. 29, 1949 |